2,856,435

Patented Oct. 14, 1958

2,856,435

1,1 DIHYDROFLUOROALKYL PERFLUOROALLYL ETHERS

Elizabeth S. Lo, Fords, N. J., assignor, by mesne assignments, to Minnesota Mining and Manufacturing Company, St. Paul, Minn., a corporation of Delaware No Drawing. Original application October 29, 1956, Serial No. 618,707. Divided and this application October 17, 1957, Serial No. 694,470

6 Claims. (Cl. 260—614)

This invention relates to a new class of fluorine-containing organic compounds and to a method for the preparation thereof. In one aspect this invention relates to new and useful fluorine-containing allyl ethers. In another aspect this invention relates to new and useful fluorine-containing polymer compositions ranging from relatively low molecular weight liquid polymers to high molecular weight solid polymers including greases, waxes, resins, and elastomers.

Fluorine-containing polymers ranging from low molecular oils to high molecular weight plastics are of outstanding industrial importance due to their marked high thermal and chemical resistance. At the same time, however, these desirable properties are often accompanied by properties which require special molding techniques for the fabrication of molded articles, special techniques for adhesion of the polymer to surfaces such as metal surfaces as well as other properties which may limit the application of the fluorine-containing polymer unless it is modified in some manner. Some of the fluorine-containing high polymers are known to possess a fair degree of resistance to swell when exposed to aromatic and aliphatic hydrocarbon type fuels and still others possess good flexibility at relatively low temperatures. It is highly desirable to obtain a polymer which has a combination of good low temperature flexibility, resistance to attack by hydrocarbon type fuels and which, in addition, possesses the other desirable properties mentioned above.

It is an object of this invention to provide a particular new class of useful fluorine-containing organic compounds.

Another object is to provide new and useful fluorine-containing ethers and to provide a process for the manufacture thereof.

Another object of this invention is to provide new and useful fluorine-containing polymers including polymers in the oil, grease, wax, and plastic range.

Another object is to provide new and improved fluorine-containing solid polymers which can be fabricated into a wide variety of useful articles of manufacture and which possess a combination of good low temperature flexibility and resistance to swell when exposed to aromatic and aliphatic hydrocarbon type oils and fuels.

Still another object of this invention is to provide new fluorine-containing polymers of improved adhesion properties which are useful, for example, for the production of laminates.

A further object of this invention is to provide a process for the preparation of fluorine-containing polymers having the aforesaid desirable properties.

Various other objects and advantages of this invention will become apparent to those skilled in the art from the accompanying description and disclosure.

Accordingly, the above objects are accomplished by the preparation of a new class of fluorine-containing organic compounds, namely haloalkyl perfluoroallyl ethers. These ethers find particular utility as chemical intermediates for the production of other valuable materials. For example, they are especially useful as copolymerizable monomers to yield interpolymers, the physical nature of which ranges from liquid products to higher molecular weight polymers including greases, soft and hard waxes, resins, and elastomers.

As indicated above, the fluorine-containing organic ethers of this invention possess, as one of the groups bonded to the ether oxygen atom, a wholly fluorinated allyl group, and as the second group which is bonded to the ether oxygen, a saturated halocarbon radical. These ethers have the general formula:

$$R\text{—}O\text{—}CF_2CF\text{=}CF_2 \qquad (1)$$

wherein R may be a partially halogenated or perhalogenated alkyl group having from 2 to 12 carbon atoms per radical and preferably not more than 8 carbon atoms per molecule. The preferred ethers of this invention are the 1,1-dihydroperfluoroalkyl perfluoroallyl ethers having the general formula:

$$C_nF_{2n+1}CH_2OCF_2CF\text{=}CF_2 \qquad (2)$$

wherein $n$ is an integer from 1 to 11. These compounds are prepared by interacting 3-chloropentafluoropropene with a 1,1-dihydroperfluoroalcohol or an alkali metal derivative thereof in an alkaline medium. It has been found that the best yields of desired ether are obtained by effecting this reaction in a strongly alkaline medium containing an alkali metal hydroxide such as sodium hydroxide and potassium hydroxide, although milder alkaline reagents may be used without departing from the scope of this invention. Typical examples of these milder alkaline compounds which may be employed are the alkali metal carbonates and the alkaline earth hydroxides, carbonates and oxides such as potassium carbonate, sodium bicarbonate, calcium carbonate, magnesium hydroxide, calcium hydroxide, magnesium oxide, and other similar compounds. The above reaction between 3-chloropentafluoropropene and the 1,1-dihydroperfluoroalcohols also may be effected in the presence of various organic amines such as pyridine, tri-n-butyl amine, tertiary butyl amine, and triethanol amine without departing from the scope of this invention.

The alcohols and derivatives thereof which are used in the preparation of the perfluoroallyl ethers of this invention are those having the general formula:

$$C_nF_{2n+1}CF_2O\text{—}Y \qquad (3)$$

wherein $n$ is as above-defined and Y is selected from the group consisting of hydrogen and an alkali metal. The alkali metal derivatives of these alcohols can be added to the reaction mixture as such and are prepared by the conventional reaction between an alkali metal or an alkali metal hydroxide with the free alcohol. The alkali metal salt of the aforesaid alcohols may also be formed in situ without departing from the scope of this invention.

The formation of the preferred type of perfluoroallyl ethers of this invention is represented by the following general equations:

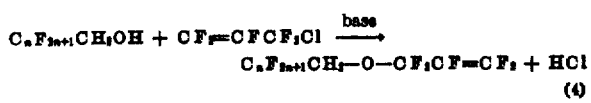

$$C_nF_{2n+1}CH_2OH + CF_2\text{=}CFCF_2Cl \xrightarrow{\text{base}}$$
$$C_nF_{2n+1}CH_2\text{—}O\text{—}CF_2CF\text{=}CF_2 + HCl \qquad (4)$$

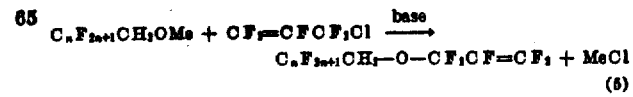

$$C_nF_{2n+1}CH_2OMe + CF_2\text{=}CFCF_2Cl \xrightarrow{\text{base}}$$
$$C_nF_{2n+1}CH_2\text{—}O\text{—}CF_2CF\text{=}CF_2 + MeCl \qquad (5)$$

wherein $n$ is as above-defined and Me is an alkali metal. The concentration of alcohol or alkali metal salt thereof with respect to the 3-chloropentafluoropropene may vary over a relatively wide range such as from about 0.1 mol and preferably from about 0.5 mol of alcohol to about 10 moles of alcohol per mol of 3-chloropentafluoropropene. The best conversions of desired ether are realized by using at least substantially equimolar amounts of the 3-chloropentafluoropropene and the alcohol. Usually less than about a 4 molar excess of alcohol is employed. The concentration of base such as potassium hydroxide also may vary over a relatively wide range and usually is used in an amount of between about 0.8 to about 4 or more moles per mol of 3-chloropentafluoropropene.

The above reaction is generally carried out at a temperature between about —10° C. to about 100° C. although lower and higher temperatures may be employed without departing from the scope of this invention. The preferred reaction temperature is between about 0° C. and about 75° C. It is to be noted that almost as soon as the three reactants, namely 3-chloropentafluoropropene, the 1,1-dihydroperfluoroalcohol, and base such as potassium hydroxide are brought into contact, an exothermic reaction occurs, and thus it is recommended that the reactants be brought into contact initially at a relatively low temperature, e. g. —80° C., followed by gradual warming of the reaction mixture to a higher temperature within the aforesaid temperature range.

The preparation of the 1,1-dihydroperfluoroalkyl perfluoroallyl ethers of this invention may be carried out in an open reaction vessel or by adding the reactants to a pressure vessel and conducting the reaction under autogenous conditions of pressure or under superimposed pressures up to about 200 pounds per square inch gage. However, the reaction is conveniently carried out at substantially atmospheric pressure.

The reaction time may similarly vary over a relatively wide range such as from about 2 minutes to about 100 hours or longer. The reaction is conducted for a period of time sufficiently long so that it is substantially completed under the conditions employed. The completion of the reaction can be determined by withdrawing samples of the reaction mixture at intervals and determining its alkalinity. When there is no substantial change in the alkalinity of the reaction mixture, the reaction can be considered to be substantially complete. Although the reaction may go to completion within a relatively short period of time, no detrimental effects are obtained by allowing the reaction mixture to stand at room temperature or at elevated temperatures to insure completion of the reaction.

The above-described reaction between the 3-chloropentafluoropropene and the 1,1-dihydroperfluoroalcohols may be carried out in the presence or absence of a diluent or solvent which is substantially inert to the reactants. Thus, for example, the reaction may be effected in an aqueous medium, or in the presence of an organic compound such as acetone, aliphatic hydrocarbons such as cyclohexane, and aromatic compounds such as xylene, benzene, and toluene and the like without departing from the scope of this invention.

When the 1,1-dihydroperfluoroalkyl perfluoroallyl ethers of this invention are subjected to the polymerization conditions to be more fully described hereinafter, they homopolymerize to relatively low molecular weight oils such as the dimer and trimer. On the other hand, it has been found that the perfluoroallyl ethers of this invention copolymerize with various monomers such as olefins containing at least one fluorine atom to yield polymers having a molecular weight from about 1,000 to about 100,000 or higher depending upon the particular comonomer and the polymerization conditions employed. The polymers of the present invention have particularly good adhesion properties. The lower molecular weight polymers in the oil, grease, and wax range are particularly useful, for example, as bonding agents, lubricants, plasticizers, and as ingredients of polish compositions. The higher molecular weight polymers such as the thermoplastics and elastomers are of value as protective coatings on metal and fabric surfaces in producing adhesives, laminates, films, and other molded articles.

The fluorine-containing olefins which are copolymerized with the perfluoroallyl ethers of this invention include both monoolefins and polyolefins preferably having not more than 12 carbon atoms per molecule. The preferred class of comonomers are those having either two fluorine atoms, or a fluorine and a chlorine atom, or a fluorine and a hydrogen atom bonded to a carbon atom which is part of an ethylenic double bond. Thus the preferred class of comonomers are those containing the following group:

$$>C=CFX \qquad (6)$$

wherein X may be hydrogen, chlorine, or fluorine. Such compounds, and especially those in which X is chlorine or fluorine, are preferred as the comonomer because when they are interpolymerized with the perfluoroallyl ethers of this invention, they lead to the production of a polymer in which the backbone of the polymer is substantially completely halogenated and in which the major number of halogen atoms bonded to the backbone structure are fluorine atoms. The combination of this highly fluorinated polymer backbone to which there are bonded 1,1-dihydroperfluoroalkyl groups represents a unique type of polymer structure. The preferred copolymers of this invention, namely those derived from the aforesaid perfluoroalkyl ethers and a fluorine-containing olefin having the above-defined $>C=CFX$ group have the following partial structure in common:

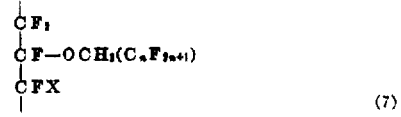

(7)

Such copolymers possess in addition to good metal adhesion properties, good low temperature flexibility and resistance to attack by corrosive chemicals and hydrocarbon oils and fuels and are moldable by conventional molding techniques.

The fluorine-containing monoolefins to be employed as comonomers in accordance with this invention include partially halogenated and perhalogenated polymerizable compounds and are preferably those having not more than 6 carbon atoms per molecule. Typical examples of suitable fluorine-containing monoolefins to be used are the partially halogenated ethylenes such as vinyl fluoride, vinylidene fluoride, 1,1-chlorofluoroethylene, trifluoroethylene, 1-chloro-2,2-difluoroethylene; partially halogenated propenes such as 3,3,3-trifluoropropene, 2,3,3,3-tetrafluoropropene, and 2-chloro-3,3,3,-trifluoropropene; partially halogenated butenes such as 3,3,3-trifluoroisobutene, 1,1,1-trifluoro-3-trifluoromethyl butene and hexafluoroisobutene; and the perhalogenated monoolefins such as trifluorochloroethylene, tetrafluoroethylene, dichlorodifluoroethylene, hexafluoropropene, 2-chloropentafluoropropene, 4,4-dichlorohexafluorobutene, and perfluorocyclobutene.

The fluorine-containing polyolefins to be used as comonomers in accordance with this invention are preferably those having conjugated diunsaturation and not more than 6 carbon atoms per molecule. Typical examples of this class of comonomers are 1,1-difluorobutadiene, 1,1-difluoro-2-methyl-butadiene, 1,1-difluoro-3-methyl-butadiene, 1,1,2-trifluorobutadiene, 1,1,3-trifluorobutadiene, 1,1,2,4-tetrafluorobutadiene, 1,1,3-trifluoro-2-methyl-butadiene, and 2-trifluoromethyl-butadiene.

Particularly valuable polymers are obtained by interpolymerization of the 1,1-dihydroperfluoroalkyl perfluoroallyl ethers of this invention with one or more of the aforesaid 1,1-difluorobutadienes such as 1,1,2- and 1,1,3-trifluoro-butadiene. These polymers are elastomeric at room temperature and possess a good combination of low temperature flexibility and resistance to swell when exposed to aromatic and aliphatic fuels.

The copolymers of this invention may be prepared in various comonomer ratios under the polymerization conditions to be more fully described hereinafter. Generally speaking, the most useful polymer compositions are those produced from monomeric mixtures containing from 5 to about 95 mol percent of the perfluoroalkyl ether, the remaining major constituent of the monomer mixture being one or more of the aforesaid fluorine-containing olefins. The preferred polymers of the present invention are those produced from monomer mixtures containing from about 5 to about 80 mol percent of the aforesaid perfluoroallyl ethers, the remaining major constituent of the monomer mixture being one or more of the aforesaid indicated fluorine-containing olefins. The particularly preferred polymers are those produced from monomer mixtures containing from about 10 to about 65 mol percent of the perfluoroallyl ether, the remaining major constituent of the monomer mixture being one or more of the aforesaid fluorine-containing olefins.

The copolymerization reaction of the present invention may be effected in the presence of a free radical forming promoter or an ionic type promoter. The polymerization initiators which are suitably employed comprise organic compounds containing a peroxy linkage (i. e. —O—O); azo compounds; inorganic halides of the Friedel-Crafts type; and Ziegler type catalysts. Generally speaking, such initiators are employed in an amount between about 0.001 and about 5 parts by weight per 100 parts of total monomer employed, preferably in an amount between about 0.01 and about 1.0 part by weight. The polymerization catalyst system may be aqueous or non-aqueous and includes aqueous suspension, aqueous emulsion, the non-aqueous static mass and stirred mass systems, and solution systems. The copolymerization reaction also may be initiated or catalyzed by actinic or ultraviolet radiation without departing from the scope of this invention.

The aqueous catalyst systems comprise water and a peroxy compound as the polymerization initiator. Emulsifiers, activators, accelerators, buffers, and bases also may be included as ingredients of the aqueous systems as desired. One type of aqueous system is that in which an organic peroxide is employed and a second type is that in which an inorganic peroxy compound is used. Exemplary of such organic peroxides are cumene hydroperoxide, diisopropyl benzene hydroperoxide, triisopropyl benzene hydroperoxide, tertiarybutyl hydroperoxide, tertiary-butyl perbenzoate and methyl cyclohexane hydroperoxide. Such organic peroxides usually are employed in conjunction with an emulsifier.

The inorganic peroxy compounds employed as the initiator in aqueous polymerization systems are preferably the water soluble inorganic peroxides such as the perborates, persulfates, perphosphates, percarbonates, barium peroxide, zinc peroxide and hydrogen peroxide. Particularly effective inorganic peroxides are the water soluble salts of the peracids such as the sodium, potassium, calcium, barium and ammonium salts of the persulfuric and perphosphoric acids such as potassium persulfate and sodium perphosphate.

Activators which are often used in conjunction with the peroxy compound comprise sodium bisulfite, sodium metabisulfite, sodium thiosulfate, sodium hydrosulfate, p-toluene sulfinic acid, a reducing sugar such as dextrose and levulose and, in general, any water soluble reducing agent. Such activators are generally employed in an amount between about 0.2 and 0.8 part by weight per 100 parts of total monomers employed.

Accelerators which may be employed in the aqueous polymerization systems comprise water soluble variable valence metal salts of sulfates, nitrates, phosphates and chlorides such as cuprous sulfate, ferrous sulfate and silver nitrate. Such activators are generally employed in an amount between about 0.01 and about 0.1 part per 100 parts of total monomers employed and preferably in an amount between about 0.05 and 0.5 part by weight. When an activator such as sodium metabisulfite, and an accelerator such as ferrous sulfate are employed, the catalyst system is referred to as a redox system. The above-mentioned organic peroxides are preferably employed in such a redox system.

The emulsifiers which are employed in the preferred aqueous emulsion polymerization systems comprise metal salts such as the potassium or sodium salt derivatives derived from saturated aliphatic acids, the optimum chain length of the acid being between about 14 and about 20 carbon atoms, and the various salt derivatives of fluorochlorocarboxylic acids and fluorocarboxylic acids having between about 6 and about 20 carbon atoms per molecule. Typical examples of the derivatives of aliphatic acids which may be employed are potassium stearate and potassium oleate and mixtures thereof. The derivatives of fluoroalkanoic acids which may be used include the metal salts of perfluoro acids such as potassium perfluorooctanoate and the derivatives of the polyfluoroalkanoic acids disclosed in U. S. Patent No. 2,559,752 as being effective dispersing agents in polymerization reactions. The preferred fluorochlorocarboxylic acid derivatives which may be used as emulsifiers are those of the perfluorochloro acids obtained upon hydrolysis of trifluorochloroethylene-sulfuryl chloride telomers in fuming sulfuric acid. Such perfluorochloro acids have the successively recurring unit, $-CF_2-CFCl-$, and a chlorine-containing end group and an even number of carbon atoms which is preferably between about 6 and about 14 carbon atoms. Typical examples of such emulsifiers are the potassium, sodium, and ammonium salts of 3,5,7,8-tetrachloroundecafluorooctanoic acid and of 3,5,6-trichloro octafluorohexanoate. The emulsifier is generally employed in a quantity between about 0.2 and about 10 parts by weight per 100 parts of total monomer and preferably between about 0.5 and about 5.0 parts by weight are used.

Buffering agents may be used to maintain appropriate pH conditions during the polymerization reaction. Typical examples of suitable buffers are disodium hydrogen phosphate, and sodium metaborate. The buffers are generally employed in an amount between about 1.0 and about 4.0 parts by weight per 100 parts water, or enough to maintain the pH of the system at a value which is preferably 7 or above.

The polymerization process of the present invention also may be effected in a non-aqueous mass or bulk polymerization system comprising an organic peroxy compound or an azo compound. The organic peroxides which may be used include the aliphatic and aromatic peroxy compounds as well as the fluorine and chlorine substituted organic peroxides. Exemplary of suitable aliphatic peroxides are diacetyl peroxide, lauroyl peroxide, tertiary-butyl peroxide, caprylyl peroxide, trichloroacetyl peroxide, perfluoropropionyl peroxide, 3-carboxy propionyl peroxide, 3,4-dibromobutyryl peroxide, trifluoroacetyl peroxide, difluoroacetyl peroxide and perfluorononanoyl peroxide. Exemplary of the suitable aromatic peroxides are benzoyl peroxide, p-nitrobenzoyl peroxide and 2,4-dichlorobenzoyl peroxide. Exemplary of the azo compounds which may be employed are alpha, alpha-azo-isobutyro-nitrile, alpha, alpha-azo-methylnitrile and alpha, alpha-azoethylnitrile.

As indicated above, Ziegler type catalysts also are suitable initiators for the copolymerization of the above-defined fluoromethyl styrenes with the diene comonomer. The preferred Ziegler catalysts which may be used are the compounds of metals of group III-A (i. e. aluminum, gallium, and indium) in which the metal is bonded to at least one alkyl group and in which the remaining valences of the metal are bonded to hydrogen, halogen, or an alkyl group, and any combination thereof. Typical examples of suitable Ziegler type catalysts which can be employed are as follows: beryllium dihydride, triethyl aluminum, triethyl indium, triisobutyl aluminum, triethyl gallium, diethyl aluminum bromide, diethyl aluminum chloride, and the like. Such catalysts may be used as essentially the sole polymerization initiator or they may be used in combination with various derivatives, preferably the halides, of metals of groups IV-B, V-B, VI-B, and VIII of the periodic system and are, for example, titanium tetrachloride, zirconium tetrachloride, and ferric chloride. The concentration of the cocatalyst such as titanium tetrachloride with respect to the Ziegler catalyst such as diethyl aluminum bromide may vary over relatively wide limits such as from 0.05 to about 2.0 moles and preferably from 0.1 to about 0.5 mole of cocatalyst per mol of Ziegler catalyst.

The copolymerization of the perfluoroallyl ethers and the aforesaid fluorine-containing olefins may be effected at a temperature from about −80° C. to about 150° C., preferably at a temperature from about −40° C. to about 100° C. When one of the above-described aqueous systems is used, a temperature from about 0° C. to about 100° C. preferably from 15° C. to about 80° C. is employed. When a mass type polymerization catalyst system is employed, the temperature usually is between about −30° C. and about 150° C., the lower temperatures, i. e. below 65° C., being employed usually when a halogenated peroxide is used, and the higher temperatures are usually used when benzoyl peroxide or tertiary-butyl peroxide is employed. When a Ziegler type catalyst is employed, the temperature of the copolymerizing system may be as low as −80° C. and is usually between about −40° C. and about 100° C.

The herein-described copolymerization process may be carried out at atmospheric pressure or autogenous pressure or superimposed pressures up to about 150 atmospheres or higher. The residence time may vary over relatively wide limits such as 0.5 hour to about 100 hours but the copolymerization is usually allowed to proceed for a period between about 2 and about 75 hours.

The copolymerization process of the present invention can be carried out in a batchwise or continuous manner as desired. One method of continuous operation involves continuously charging a mixture of the comonomers to a polymerization zone containing the catalyst solution while maintaining a constant pressure in the reaction zone, the pressure in the zone being maintained below the pressure at which one and preferably both of the monomers condense at a specific temperature of reaction, and continuously withdrawing the polymer product as it is formed.

It has been found that the addition of various polymerization modifiers appreciably reduces the molecular weight of the copolymer products thereby increasing their solubility and ease of fabrication without unduly affecting the over-all yield. Suitable polymerization modifiers include mercaptans such as dodecyl mercaptan, sulfuryl halides such as sulfuryl chloride, and halogenated organic compounds such as chloroform, 1,1,2-trichlorotrifluoroethane (Freon 113), carbon tetrachloride, bromotrichloromethane and trichloroacetyl chloride. Such modifiers are preferably added in amounts between about 0.1 and about 2 parts by weight per 100 parts of total monomers charged to the polymerization reaction zone.

Plasticizers and finely divided solids which serve as fillers can be included in the polymerization mixture and the polymerization can be carried out in their presence. Examples of suitable fillers include pigments such as titanium oxide, metals such as copper and iron powder and other finely divided materials such as mica and asbestos. These and similar materials can also be added to the preformed polymers.

The following examples are offered as a better understanding of the present invention and are not to be construed as unnecessarily limiting thereto.

*Example 1*

To a 250 cc. round bottom one neck flask containing 100 grams of 1,1-dihydroperfluoroethanol, there were added 11.2 grams (about 0.2 mol) of potassium hydroxide pellets. The resulting solution was then frozen and there were then added thereto 20 cc. (about 33.5 grams, 0.2 mol) of 3-chloropentafluoropropene. A reflux condenser was then placed in the neck of the flask using a mixture of Dry Ice and acetone as the cooling medium. The reaction mixture was then allowed to warm to room temperature (about 22° C.) over a period of 1.5 hours during which time a large amount of white precipitate formation was observed. The flask was then warmed in a hot water bath at 80° C. for about 4 hours. After cooling the reaction mixture to room temperature, the pH of the reaction mixture was found to be 6 indicating that all of the potassium hydroxide had reacted. The reaction mixture was then subjected to fractional distillation to yield the following fractions: Fraction (1) boiling point 56–71° C.; and fraction (2) boiling point 74° C. Mass spectrometer analysis of fraction (1) showed this fraction to contain about 20 mol percent of

and mass spectrometer analysis of fraction (2) indicated this fraction to contain a substantial amount of the same compound. Further purification was carried out as follows: Fractions (1) and (2) were combined and washed with water to remove $CF_3CH_2OH$, dried on magnesium sulfate and fractionated. About 22 grams of colorless liquid boiling between 55°–56° C. was collected. Infrared analysis of this fraction showed the presence of —CH, —CF, —CF=CF— and —C—O—C— groups.

*Example 2*

To a 3-necked glass flask there were added 23 grams (0.23 mol) of 1,1-dihydroperfluoroethanol and 43.8 grams (0.263 mol) of 3-chloropentafluoropropene. The solution was stirred with magnetic stirrers for about 2 hours at 22° C. but under these conditions essentially no reaction occurred. A reflux condenser was then fitted to the flask using a Dry Ice-acetone mixture as the cooling medium. About 17 cc. of water containing about 15 grams of dissolved potassium hydroxide were then slowly added to the contents of the reaction flask. After complete addition of the aqueous potassium hydroxide solution, the reaction mixture was refluxed for a period of about 2 hours. The solution was then cooled and washed several times with water. The lower layer was dried with drierite and 45.5 grams of a colorless liquid was obtained which liquid was then subjected to fractional distillation to obtain the following fractions: Fraction (1) boiling point 53–55° C.; fraction (2) boiling point 56° C.; fraction (3) boiling point 59–88° C.; and fraction (4) boiling point 91° C. A very viscous residue remained in the distillation flask and is believed to be compounds of higher molecular weight than

Mass spectrometer analysis of fraction (2) above showed this fraction to contain at least 90 mol percent

and fluorine analysis showed this fraction to contain 64.8 percent fluorine (calculated fluorine percent for $C_5F_8H_2O$ is 66.0).

*Example 3*

To 49 cc. of 3-chloropentafluoropropene contained in a 500 cc. glass flask fitted with a Dry Ice-acetone cooled reflux condenser there were added 250 grams of reaction mixture obtained by reacting 1,1-dihydroperfluoroethanol with 11.5 grams of metallic sodium in a separate reaction zone. This reaction mixture containing the 3-chloropentafluoropropene, $CF_3CH_2ONa$ and excess of $CF_3CH_2OH$ was allowed to warm gradually to room temperature (22° C.) and was then heated at a temperature of about 80° C. for a period of about 4 hours. During the reaction a white powder and a colorless liquid was observed in the reaction zone. The liquid layer was separated and dried under anhydrous magnesium sulfate for about 40 hours. About 110.5 grams of crude liquid product was obtained. The liquid product was then subjected to fractional distillation and the following fractions were obtained: Fraction (1) boiling point 32–56° C. (9.1 grams); fraction (2) boiling point 56–57° C. (5.7 grams); fraction (3) boiling point 96–130° C. (71.5 grams). Mass spectrometer analysis of the above fractions showed fraction 1 to consist essentially of $CF_2=CFCF_2OCH_2CF_3$ and small amounts of impurities having the empirical formula: $C_3F_7OClH$ and $C_3F_6Cl$. Fraction (2) was the purest fraction and contained $CF_2=CFCF_2OCH_2CF_3$ as essentially the only compound. Mass spectrometer analysis of fraction (3) showed this fraction to contain higher molecular weight compounds which are believed to be compounds having the formulas:
$CF_3CH_2OC=CFCF_2OCH_2CF_3$ or $$CF_3CH_2OCF_2CFCF_2Cl$$

*Example 4*

The procedure of Example 1 above was repeated under essentially the same reaction conditions except that potassium carbonate was used instead of potassium hydroxide to effect reaction between the 3-chloropentafluoropropene and the 1,1-dihydroperfluoroethanol. A substantial yield of $CF_3CH_2OCFCF=CF_2$ was obtained and recovered as a product of this reaction.

*Example 5*

The procedure of Example 4 above was repeated except except that the 3-chloropentafluoropropene, the 1,1-dihydroperfluoroethanol and potassium carbonate were charged to a bomb and were interacted under autogenous conditions of pressure for a period of 20 hours at 150° C. with constant rocking of the reaction vessel. The bomb was then opened and vented to remove unreacted 3-chloropentafluoropropene. The contents of the bomb were then transferred to a flask and sodium chloride was added thereto. The layers which formed were then separated and the lower layer was washed several times with water. The washed lower layer was distilled to yield $CF_2=CFCF_2OCH_2CF_3$ (boiling point 56–57° C.) in good yield.

By interacting 3-chloropentafluoropropene with 1,1-dihydroperfluoroalcohols other than 1,1-dihydroperfluoroethanol under alkaline conditions following the procedures of the above examples other perfluoroalkyl perfluoroallyl ethers are obtained. Thus, for example, when the following reactions are carried out under approximately the same reaction conditions employed in the above examples, e. g. in the presence of a base such as potassium hydroxide, the following 1,1-dihydroperfluoroalkyl perfluoroallyl ethers are obtained and recovered as the products of the reactions:

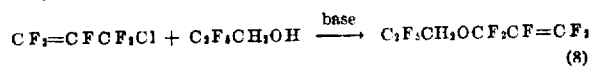

(8)

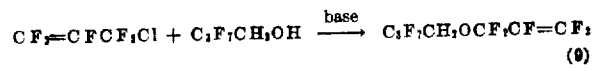

(9)

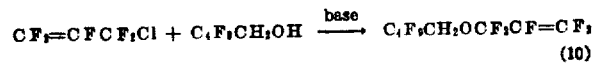

(10)

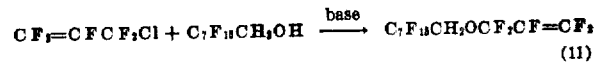

(11)

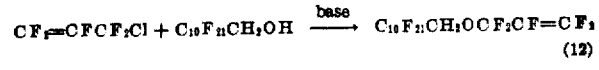

(12)

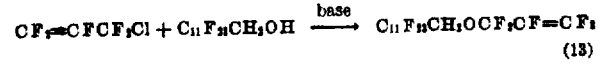

(13)

*Example 6*

A stainless steel polymerization bomb having a volume capacity of about 45 cc. was flushed with nitrogen and was then charged with 12 cc. of a solution prepared by dissolving 0.25 gram of perfluorooctanoic acid and 1 gram of disodium hydrogen phosphate heptahydrate in 30 cc. of water. After freezing the contents of the bomb, the bomb was then charged with 8 cc. of a solution prepared by dissolving 0.25 gram of potassium persulfate in 20 cc. of water. The contents of the bomb were then frozen at liquid nitrogen temperature and the bomb was evacuated. Thereafter 6.98 grams of 1,1-dihydroperfluoroethyl perfluoroallyl ether prepared as described in the above examples and 2.92 grams of vinylidene fluoride were charged to the bomb to make up a total monomer charge containing 40 mol percent of the aforesaid perfluoroallyl ether and 60 mol percent of vinylidene fluoride. The bomb was then closed and rocked in an electric rocker maintained at a constant temperature of 50° C. for a period of 71 hours. The bomb was then vented to atmospheric pressure followed by freezing of the reaction product at a temperature of about −5° C. The coagulated product was cooled, thoroughly washed with hot water and dried in vacuo at a temperature of 35° C. A sticky solid copolymer product was obtained in about a 25 percent conversion. This copolymer is particularly useful as an adhesive for bonding halogenated polymer surfaces, for example, to metal surfaces such as chromium, steel and aluminum.

*Example 7*

After flushing a polymerization glass tube having a volume capacity of 20 cc. with nitrogen there were added thereto 6 cc. of a solution prepared by dissolving 1.0 gram of perfluorooctanoic acid and 4 grams of disodium hydrogen phosphate heptahydrate in 120 cc. of water. After freezing the contents of the tube there were then added 4 cc. of a solution prepared by dissolving 1 gram of potassium persulfate in 80 cc. of water. After refreezing the contents of the tube, there were then added thereto 2.75 grams of 1,1-dihydroperfluoroethyl perfluoroallyl ether and 2.25 grams of 1,1-chlorofluoroethylene to make up a total monomer charge containing 30 mol percent of the ether and 70 mol percent of the 1,1-chlorofluoroethylene. The bomb was then closed and rocked for a period of 23 hours in a constant temperature water bath maintained at 50° C. The contents of the bomb were then frozen at about −5° C. to coagulate the resulting polymer latex. The coagulated product was cooled, thoroughly washed with hot water and dried in vacuo at a temperature of 35° C. The copolymer product thereby obtained was a grease and is particularly useful as a bonding agent and as a high temperature lubricant.

*Example 8*

A glass polymerization tube was charged with the same emulsion catalyst system and in the same manner as set forth in Example 7 above. Thereafter the tube was charged with 2.38 grams of 1,1-dihydroperfluoroethyl perfluoroallyl ether and 2.62 grams of 1,1,3-trifluorobutadiene to make up a total monomer charge containing 30 mol percent of the ether and 70 mol percent of the 1,1,3-trifluorobutadiene. The copolymerization reaction was carried out at a temperature of 50° C. for a period of 23 hours under autogenous conditions of pressure. The polymer product was worked up in the same manner as described in Example 7 above. A rubbery product was obtained in about a 34% conversion. This copolymer product was found to contain about 43.03 percent carbon and about 2.45 percent hydrogen and is particularly useful as a rubber cement and as a protective coating on metal surfaces which are to be exposed to strong and corrosive and extreme temperature conditions.

*Example 9*

A glass polymerization tube was flushed with nitrogen and was then charged with 5 cc. of a solution prepared by dissolving 5 grams of potassium stearate in 100 cc. of water and having a pH adjusted to 11.0 The contents of the tube were then frozen followed by the addition thereto of 4 cc. of a solution prepared by dissolving 0.75 gram of potassium persulfate in 80 cc. of water. The contents of the tube were once again frozen followed by the addition thereto of 1 cc. of a solution prepared by dissolving 0.4 gram of sodium metabisulfite in 20 cc. of water. After freezing the contents of the tube, there were added thereto 2.38 grams of 1,1-dihydroperfluoroethyl perfluoroallyl ether and 2.62 grams of 1,1,2-trifluorobutadiene to make up a total monomer charge containing 30 mol percent of the ether and 70 mol percent of the 1,1,2-trifluorobutadiene. The tube was then closed and the copolymerization reaction was effected over a period of 23 hours at a constant temperature of 50° C. under autogenous conditions of pressure. The polymer product was worked up as described in Example 7 above. A rubbery copolymer was obtained in about a 43 percent conversion. The copolymer product of this example was found to mill easily on a conventional two roll rubber mill at 25° C. to form a smooth rubbery sheet and was compression molded at 250° F., 275° F., 300° F. and 340° F. for a period of 10 minutes at each temperature. The molded sample was a clear and continuous film. The low temperature flexibility of this copolymer product was excellent as shown by the following Gehman stiffness values which represent the temperatures at which the polymer is 2, 5, 10, and 100 times as stiff as it is at 25° C. $T_2 = -13.8°$ C.; $T_5 = -28.8°$ C.; $T_{10} = -35.8°$ C.; and $T_{100} = -70.0°$ C. The percent volume increase of the copolymer prepared in accordance with this example as determined as ASTM Fuel Type 2 which consists of isooctane (60 percent by volume) benzene (5 percent by volume) toluene (20 percent by volume) and xylene (15 percent by volume) was only 19.63 percent. This copolymer product is useful as an adhesive and as a protective lining for reaction vessels in which strong and corrosive chemicals are to be used at extreme temperature conditions. It is also useful as a laminate which because of its environment requires good chemical and thermal stability up to 300° F.

*Example 10*

A glass polymerization tube was charged with the same alkaline emulsion catalyst system and in the same manner as set forth in Example 9 above. Thereafter the tube was charged with 0.95 gram of 1,1-dihydroperfluoroethyl perfluoroallyl ether, 1.80 grams of 1,2,2-trifluorobutadiene and 2.25 grams of 1,1,3-trifluorobutadiene to make up a total monomer mixture containing 10, 40, and 50 mol percent of each of these monomers, respectively. The tube was then closed and the terpolymerization reaction was effected at a temperature of 50° C. for a period of 29 hours under autogenous conditions of pressure. The polymer product was worked up in the same manner as described in Example 7 above. A rubbery product was obtained in about a 68 percent conversion, based on the total monomers charged to the reaction zone. This product was a terpolymer of the 1,1-dihydroperfluoroalkyl perfluoroallyl ether, the 1,1,2-trifluorobutadiene, and the 1,1,3-trifluorobutadiene. After milling of the raw polymer sample on a conventional two rubber mill at 25° C., the polymer was a soft and smooth rubber.

By employing procedures similar to those of Examples 6–10 above, the other 1,1-dihydroperfluoroalkyl perfluoroallyl ethers of this invention may be interpolymerized with fluoroolefins such as vinylidene fluoride, 1,1-chlorofluoroethylene, 1,1,2-trifluorobutadiene, and 1,1,3-trifluorobutadiene to obtain useful copolymeric materials.

As indicated above, the copolymers of this invention may be applied as protective coatings to various surfaces. The application of the polymers of this invention to the surface is usually effected by applying a dispersion or a solvent of the copolymer to the surface. Various dispersing media may be employed in dispersing the copolymers of this invention for application to surfaces. Such dispersing media comprise the aliphatic ketones, esters, cycloethers, Cellosolves and Freons. Typical examples of the dispersing agents are: methyl ethyl ketone, methyl isobutyl ketone, methyl acetate, butyl acetate, amyl acetate, tetrahydrofuran, ethoxy ethanol, dichlorobenzotrifluoride, 1,1,2-trifluorotrichloroethane, and any admixture thereof. Surfaces may be coated by dipping the surfaces of the article into the dispersion followed by fusion or sintering. Another method of applying the copolymers of this invention to surfaces involves dissolving the polymer in a suitable solvent such as tetrahydrofuran and evaporating the solvent after application of the solution to the surfaces to be coated. After the polymeric coating composition has been applied to the surface, the solvent is permitted to evaporate. This also may be accomplished in the presence of cross-linking agents at elevated temperatures, if so desired. In many applications it is desirable to include in the copolymeric coating composition various vulcanizing agents. In the latter case, supplementary heat treatment of the coating is required either during the solvent removal step or thereafter. After the solvent has been completely evaporated, the coated surface is ready for use. In this respect, it should be noted that the polymeric coating composition may be applied to the surface either as a single coating or if so desired, the protective coating may be built up by the application of several layers, each layer being permitted to harden by solvent evaporation before the next layer is applied. Furthermore, if so desired, the protective coatings or the polymeric composition when obtained in the form of sheets may be pigmented.

The 1,1-dihydroperfluoroalkyl perfluoroallyl polymers of this invention are particularly useful as adhesives for bonding a halogenated polymer surface such as a polymer of trifluorochloroethylene including both homopolymers and copolymers thereof to other surfaces. Thus the polymers of this invention may be applied to one of the components to be bonded. This coated surface is then maintained in contact with a surface of the component to which it is to be bonded under slight pressure and at elevated temperatures to produce a laminated structure in which individual components are strongly bonded together. The surface of the second component to which the copolymer surfaces of this invention may be bonded includes various polymer surfaces such as those of trifluorochloroethylene/vinylidene fluoride copolymers and trifluorochloroethylene/tetrafluoroethylene copolymers and other polymeric and nonpolymeric materials. Thus, the above laminate comprising the copolymers of this invention bonded to polytrifluororchloroethylene homopolymer, for example, may be bonded to metals such as iron, chromium, steel, aluminum, copper, and brass and to other nonmetallic surfaces such as glass and porcelain. In addition, the second component may be a natural fiber textile such as cotton, wool, and canvas, a synthetic organic textile such as nylon and Orlon and inorganic textiles such as fiber glass, asbestos, etc.

When the copolymers of this invention are employed as adhesives, the copolymer is preferably dissolved or dispersed in a solvent. A particularly suitable solvent is tetrahydrofuran. The adhesive is applied to the surface of at least one of the components which is to be bonded by any convenient technique. Thus, the copolymer may be dissolved in a solvent and the resulting solution applied by brushing, spraying, dipping, or any other conventional procedure. When used in the form of a solution, the adhesive may constitute between about 1 and about 40 percent by weight of the solution, preferably between about 5 and about 20 percent by weight. When a solvent is used, the solvent is preferably evaporated before the adhesive is placed in contact with the second surface since the adhesive dries more readily. Evaporation, before contact is made with the second surface, is preferably achieved by heating at elevated temperatures up to 100° C. in an oven or by circulating heated air, although air drying at ambient temperatures may be used where time is not a factor. The copolymer may also be applied in dry form either as a film or as a powder.

After the surface of one of the components has been coated with the copolymeric adhesive, the surface of the second component is brought into contact with the coated proportion of the first surface. The resulting assembly is then maintained at an elevated temperature and under slight pressure.

Other uses for the polymer compositions of the present invention and especially for the polymer products obtained by copolymerizing 1,1-dihydroperfluoroethylene perfluoroallyl ether with one of the aforesaid 1,1-difluorobutadienes, reside in the fabrication of pump valves, O-rings, gaskets, sheet and valve discs, grommets, and other such items which will be exposed to extreme temperature conditions and to aromatic and aliphatic type oils and fuels in the course of performing their function.

Various alterations and modifications of the reactants and reaction conditions employed and in the novel compositions of this invention may become apparent to those skilled in the art without departing from the scope of this invention.

This application is a division of application Serial No. 618,707, filed on October 29, 1956.

Having described my invention, I claim:

1. A 1,1-dihydrofluoroalkyl perfluoroallyl ether in which the alkyl group contains from 2 to 12 carbon atoms.
2. A 1,1-dihydroperfluoroalkyl perfluoroallyl ether in which the alkyl group contains from 2 to 12 carbon atoms.
3. A 1,1-dihydroperfluoroethyl perfluoroallyl ether.
4. A process which comprises interacting a chloroperfluoropropene and a 1,1-dihydroperfluoroalcohol in an alkaline medium to produce a 1,1-dihydroperfluoroalkyl perfluoroallyl ether.
5. A process which comprises interacting 3-chloropentafluoropropene and a 1,1-dihydroperfluoroalcohol in an alkaline medium at a temperature between about −10° C. and about 100° C. to produce a 1,1-dihydroperfluoroalkyl perfluoroallyl ether.
6. A process which comprises interacting 3-chloropentafluoropropene and 1,1-dihydroperfluoroethanol in an alkaline medium at a temperature between about −10° C. and about 100° C. to produce a 1,1-dihydroperfluoroethyl perfluoroallyl ether.

References Cited in the file of this patent

UNITED STATES PATENTS

| | | |
|---|---|---|
| 2,623,096 | Robinson | Dec. 23, 1952 |
| 2,671,799 | Miller | Mar. 9, 1954 |
| 2,730,543 | Rendall et al. | Jan. 10, 1956 |

UNITED STATES PATENT OFFICE
CERTIFICATE OF CORRECTION

Patent No. 2,856,435                      October 14, 1958

Elizabeth S. Lo

It is hereby certified that error appears in the printed specification of the above numbered patent requiring correction and that the said Letters Patent should read as corrected below.

Column 2, line 48, formula (3) should appear as shown below instead of as in the patent:

$$-- C_nF_{2n+1}CH_2O-Y --$$

Signed and sealed this 14th day of June 1960.

(SEAL)
Attest:

KARL H. AXLINE
Attesting Officer

ROBERT C. WATSON
Commissioner of Patents